United States Patent [19]

Gobert

[11] Patent Number: 5,159,567
[45] Date of Patent: Oct. 27, 1992

[54] PROGRAMMABLE SERIAL MULTIPLIER

[75] Inventor: Jean Gobert, Maisons-Alfort, France

[73] Assignee: U.S. Philips Corp., New York, N.Y.

[21] Appl. No.: 627,153

[22] Filed: Dec. 13, 1990

[30] Foreign Application Priority Data

Dec. 15, 1989 [FR] France .................. 89 16634

[51] Int. Cl.⁵ .............................. G06F 7/52
[52] U.S. Cl. ........................ 364/757; 364/754
[58] Field of Search .................. 364/757, 754

[56] References Cited

U.S. PATENT DOCUMENTS

| | | | |
|---|---|---|---|
| 3,456,098 | 7/1969 | Gomez et al. | 364/757 |
| 4,839,847 | 6/1989 | Laprade | 364/754 |
| 4,853,887 | 8/1989 | Jutand et al. | 364/757 |
| 5,031,137 | 7/1991 | Elrod | 364/757 |

FOREIGN PATENT DOCUMENTS

| | | | |
|---|---|---|---|
| 1256221 | 12/1971 | United Kingdom | 364/757 |
| 2179770 | 3/1987 | United Kingdom | 364/757 |

*Primary Examiner*—David H. Malzahn
*Attorney, Agent, or Firm*—Jack D. Slobod

[57] ABSTRACT

A programmable serial multiplier performing the multiplication of a multiplicand by a fixed constant coded on r bits is formed from a battery of $(r/2)-1$ addition cells ($11_0-11(r/2)-2$) interconnected in series by a first input, a shift register formed from $(r/2)+1$ initializable flip-flops ($10_0-10_r/2$), and an interconnection channel. The latter makes it possible to program the serial multiplier in order to perform the multiplication by the fixed constant C, either with the aid of the value $+C$ when the constant C contains, in binary notation, a number of 1s less than or equal to the number of 0s, or with the aid of the value $-C$ in the reverse case. It may operate with a signed fixed constant C.

A computational processor which carries out a linear transform of numerical data, implements such a multiplier. For each multiplication of the linear transform, the processor may operate either with the constant proper or with the constant's oppositely signed number. For each step of the computation, the correct result is then determined by inverting the type of operator provided for the summation operation concerned.

3 Claims, 4 Drawing Sheets

PROGRAMMABLE SERIAL MULTIPLIER

BACKGROUND OF THE INVENTION

1. Field of the Invention

The invention relates to a programmable serial multiplier performing the multiplication of a multiplicand by a fixed constant which includes:
an addition cell formed by
   a 1 bit full adder,
   a flip-flop which retards the carry in order to insert it into an input of the same adder,
   and a retard element operating on the result from the adder It also relates to a computational processor performing a linear transform of data employing such a multiplier.

2. Description of the Related Art

Numerous embodiments of serial multipliers exist which are well suited to the processing of signals the regularity of the data streams of which makes it possible to exploit the pipelining possibilities of these serial multipliers. One particular class of these multipliers produces the product of a variable and a constant, then referred to as the coefficient. Applications thereof are found in filters, Fourier transforms, cosine transforms, etc. Advantage can be drawn from the fact that the constant is known when designing the circuit. It is then no longer necessary to provide data paths to route the coefficients. Such a multiplier is programmed by branching the corresponding inputs of the multiplier to 1 or to 0. It is easy to design but does not push to the limit the optimizations which are possible depending on the value of the coefficients. The optimization can be pushed much further: one example thereof is described in the patent "Method and digital circuit for fixed coefficient serial multiplication" GB 2,179,770 A.

This document proposes a serial multiplier which carries out multiplications of a multiplicand by a constant which is a fractional number. This constant is programmed by retarding the result obtained as output from the adder of the multiplier before inserting this result as input to this same adder in order to add it to the subsequent term. The result of a multiplication is therefore obtained after a computation time which depends on the fixed constant employed. This multiplier is not however designed to treat the cases of arbitrary constants. The structure of such a multiplier is therefore very dependent on the coefficients employed and this may pose difficulties whilst designing a circuit operating with multiple constants which it may be led to rapidly change at least cost.

In fact, modern methods of designing circuits and, in particular, integrated circuits, call upon computer aided design CAD techniques. A basic cell (for example a multiplier) is available in a library and, during design, it must be adapted to the operations which are to be carried out. It is therefore desirable that this basic cell is the most universal possible and may be adapted without difficulty to a vast field of possibilities. In particular, in the case of a multiplication by a constant, it is desirable that the type of constant does not call into question the fundamental structure of the multiplier. This should be solved by minimal attachments, readily and rapidly produced by the designer. In an integrated circuit context, the structure of the multiplier and hence the plan of the masks is an aspect which takes on great importance. A basic plan must be designed which is very close to the final structure and which is the least dependent possible on the coefficients to be inserted. Moreover, when it is desired to employ several serial multipliers of this type in a computational processor, it is necessary to try to minimize to the extent possible the specific operations for assemblage of cells. Stacks of serial multipliers, designed to order, are sometimes difficult to produce. This difficulty in readily designing stacks of several multipliers is coupled with another disadvantage relating to the speed of the processing carried out. In fact, with serial multipliers designed to order, each one has its own speed related to the coefficient processed, which does not make it possible to define common specifications and militates against the perfecting of the stack. CAD techniques find themselves affected thereby.

SUMMARY OF THE INVENTION

The problem which is posed consists in designing a generic serial multiplier architecture capable of being programmed with the aid of a fixed coefficient during the design of the circuit, and which is optimized and simple to employ. It should not exhibit the following disadvantages:

it should not be delicate to design, in particular if it is wished to make therefrom a basis for a circuit parametrizable as a function of the coefficient by employing a silicon compilation approach, the form and the dimensions of the multiplier should not depend on the coefficient, which would be problematic in certain applications when it is desired to make stacks from these circuits. In fact, this would prevent them being assembled by simple abutment. A loss of space on the circuit would result therefrom.

the number of totalling stages must not depend on the coefficient since the delay in obtaining the product would also depend on the coefficient, which would also be a complication in the uses in which several of these multipliers are employed in parallel and in which their results have to be combined whilst conforming with a synchronization.

The solution consists in a programmable serial multiplier such as defined in the first paragraph and which comprises:

a battery of $(r/2)-1$ addition cells interconnected in series by a first input, the shift register being formed from $(r/2)+1$ initializable flip-flops, and connection means which make it possible to program the serial multiplier in order to perform the multiplication by the fixed constant C, either with the aid of the value $+C$ when the constant C contains, in binary notation, a number of 1s less than or equal to the number of 0s, or with the aid of the value $-C$ in the reverse case, the programming being carried out by bringing together at the outputs of the shift register at least part of the inputs of the first addition cell and of the second inputs of the other addition cells, and by rendering the other part inoperative.

Thus advantageously, such a multiplier is readily parametrizable as a function of the coefficient employed. Its form and its dimensions do not depend on the coefficient. It is easy to assemble several multipliers by simple abutment. This is reflected by a space saving on the plan of the integrated circuit. When several multipliers are employed together there is no synchronization and computation time problem. Thus, multiplier assemblages with homogeneous characteristics (topography, speed) are available.

In the circuit according to the invention the multiplier is partitioned into specified functional blocks connected by a parametrizable interconnection channel. An interconnection diagram corresponds to the programming of the particular coefficient. The form of the blocks and of the channel does not change and may be planned out in advance. An important point for large scale integrated circuit production is to obtain a multiplier the plan of which does not vary too much as a function of the value of the coefficient. The proposed circuit employs a specific number of adders, even if a smaller number is sufficient for a particular value of the constant. The only portion of the multiplier variable as a function of the value of the coefficient is therefore localized in the interconnection channel, thus not affecting the form of the circuit. The optimization relative to the coefficient resides in the fact that only $(r/2)-1$ addition cells are provided, that is to say one cell less than half the number of bits equal to 1 of the constant expressed in binary notation. In the case where an adder is inactive its input is branched to 0. This wiring is also made in the interconnection channel. An interesting consequence of this arrangement is that the delay in obtaining the product is constant whatever the value of the coefficient. This is particularly useful when this multiplier is integrated into a synchronous "serial bit" processor.

The multiplier may operate with multiplicands and/or signed or unsigned coefficients. To operate with a signed fixed constant C, the first input of the first addition cell may be connected up to the said last flip-flop through an inverter, it being possible to initialize either to 1 or to 0 the flip-flop retarding the carry from the said first addition cell.

The stacks which it is possible to produce with such a type of multiplier may for example constitute a computational processor for carrying out a linear transform, for example, Fourier transforms, cosine transforms etc. Processors for computing such transforms are well known and it is possible to refer for example to the document FR-2,596,892.

Such an implementation of a discreet cosine transformation DCT calls upon a battery of multipliers, adders and subtracters. After each multiplication summation operations are performed. The fixed coefficients are combinations of particular cosine values. This summation may consist of an addition or a subtraction. Moreover, according to the value of the fixed coefficient expressed in binary notation, the number r of bits at the logic 1 state may be greater than/equal to or less than $r/2$. The multipliers then operate either with a constant $+C$ or with a constant $-C$ (with inverted bits) so that the number of 1s− of the binary notation is equal to or less than $r/2$. If one of the coefficients has been inverted, to implement the summation operation it then suffices to implement the processor so that an addition operation is replaced by a subtraction operation or vice versa. If both coefficients have been inverted, the change is to be carried out not at this summation, but at the first subsequent summation which is not in this same situation.

In this event the invention relates to a computational processor which determines transformed data from input data according to a linear transform which carries out operations for multiplication of at least one multiplicand by at least one constant, then operations for summation of the partial results, characterized in that the said multiplications are carried out in series as described previously, and when a summation operation is to be carried out on two partial results one of which was obtained from a processing by the constant's oppositely signed number, the said summation operation is performed by inverting the type of operator initially provided, and when a summation operation is to be carried out on two partial results which were both obtained from a processing by a constant with inverted bits, the said summation operation is performed by retaining the type of operator initially provided, the operator type inversion being carried over to the first subsequent summation operation operating on a single inverted partial result.

BRIEF DESCRIPTION OF THE DRAWING

The invention will be better understood with the aid of the following figures given by way of non-limiting example in which.

DETAILED DESCRIPTION OF THE PREFERRED DRAWING

Figure 1:
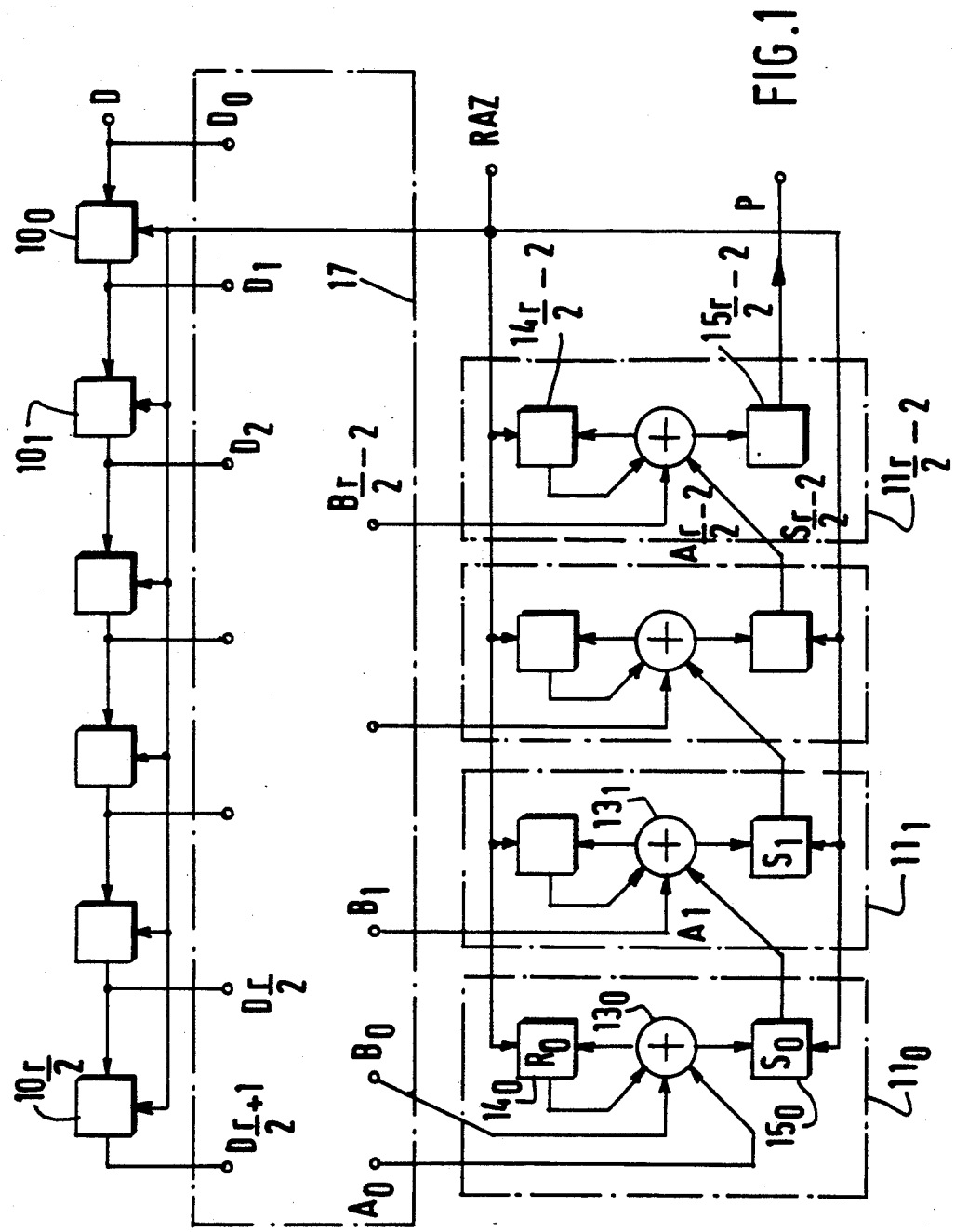
FIG. 1 is a diagram of a multiplier according to the invention operating with an unsigned fixed coefficient.

FIG. 1 shows a diagram of a serial multiplier operating with an unsigned fixed constant. The device functions in cycles of several clock beats operating on each of the registers. The multiplicand D is a signed 2's complement variable coded on d bits. The field of application of this multiplier is restricted to coefficients not having more 1 than 0 bits. The coefficient C is a number coded on r bits and consequently the product P is a signed integer coded on $p=r+d$ bits. The multiplicand D is presented serially, bit by bit, with the lowest order first. The sign bit of the multiplicand is extended over r positions to total $r+d=p$ bits. The product is also generated serially, lowest order bit first. The multiplier is composed of three elements:

a shift register with $(r/2)+1$ flip-flops $10_0, 10_1, \ldots, 10(r/2)$, traversed by the multiplicand in this order. The register is reset to 0 on initialization. The input of this register and the outputs of all of the flip-flops are connected by the terminals $D_0, D_1, \ldots D(r/2)+1$ to an interconnection channel 17 described below.

a battery of 1 bit addition cells $11_0, 11_1, \ldots, 11(r/2)-2$, each including a flip-flop $15_0-15(r/2)-2$ for the sum and a flip-flop $14_0-14(r/2)-2$ for the carry. All these flip-flops are also initialized to 0. Each addition cell except the first has its input $A_j$ connected to the sum output of the preceding one, whilst the inputs $B_j$ and the input $A_0$ of the input cell are connected to the interconnection channel 17. The product P is available at the sum output $S(r/2)-2$ of the final flip-flop $15(r/2)-2$.

the interconnection channel 17 enables the inputs $B_j$ of the adders and the input $A_0$ of the first adder to be connected to any one of the outputs $D_0-D(r/2)+1$ of the shift register or else to 0. A particular wiring corresponds in fact to the programming of the value of a given coefficient.

The product P is equal to the sum of the partial products $P = \Sigma$ from $i=0$ to $r-1$ $P_i$. Each partial product is itself equal to the product of the multiplicand and the order i bit $C_i$ of the coefficient: $P_i = 2^i.C_i.D$. The sum is produced by the addition cells, each one adding a partial product to the preceding partial total. The multiplication by $C_i$ is obtained by ignoring the partial products where $C_i$ is zero. The multiplication by $2^i$ is obtained by selecting a flip-flop of the shift register containing the multiplicand retarded by i positions, and is filled in at the low order end by i zeros. The left-hand (order 0) adder adds up the partial products corresponding to the most significant b 1 bits of the coefficient, whilst the right-hand (order $r/2-2$) one inserts the partial product corresponding to the least significant 1 bit. Each adder of order j requires one clock period to deliver its result and, to compensate for this delay, the partial product $P_i$ will have to be taken at the output $D_q$ with $q = i + j - r/2 + 2$. With the coefficient not having more 1s than 0s, there are therefore at most $r/2$ 1 bits. Each of these bits contributes to forming a partial product, the zero bits not coming into the computation of the product. There are therefore at most $r/2$ partial products to be added up, which can be achieved with $(r/2)-1$ adders and $(r/2)+1$ cells of the shift register. The generation of r-1 zeros at the beginning of the multiplicand necessary for the partial product corresponding to the highest order of the coefficient, is effected by the resetting to zero (RAZ) of the shift register and of the flip-flops of the adders. This produces $(-1)+(+1)=r$ zeros: in all strictness, the flip-flop of the final adder need not be reset to zero. The lowest order bit of the product appears one clock cycle after the start of the operation and the highest order bit p cycles later. The complete computation of the product therefore requires $p+1$ clock cycles.

Figure 2A:
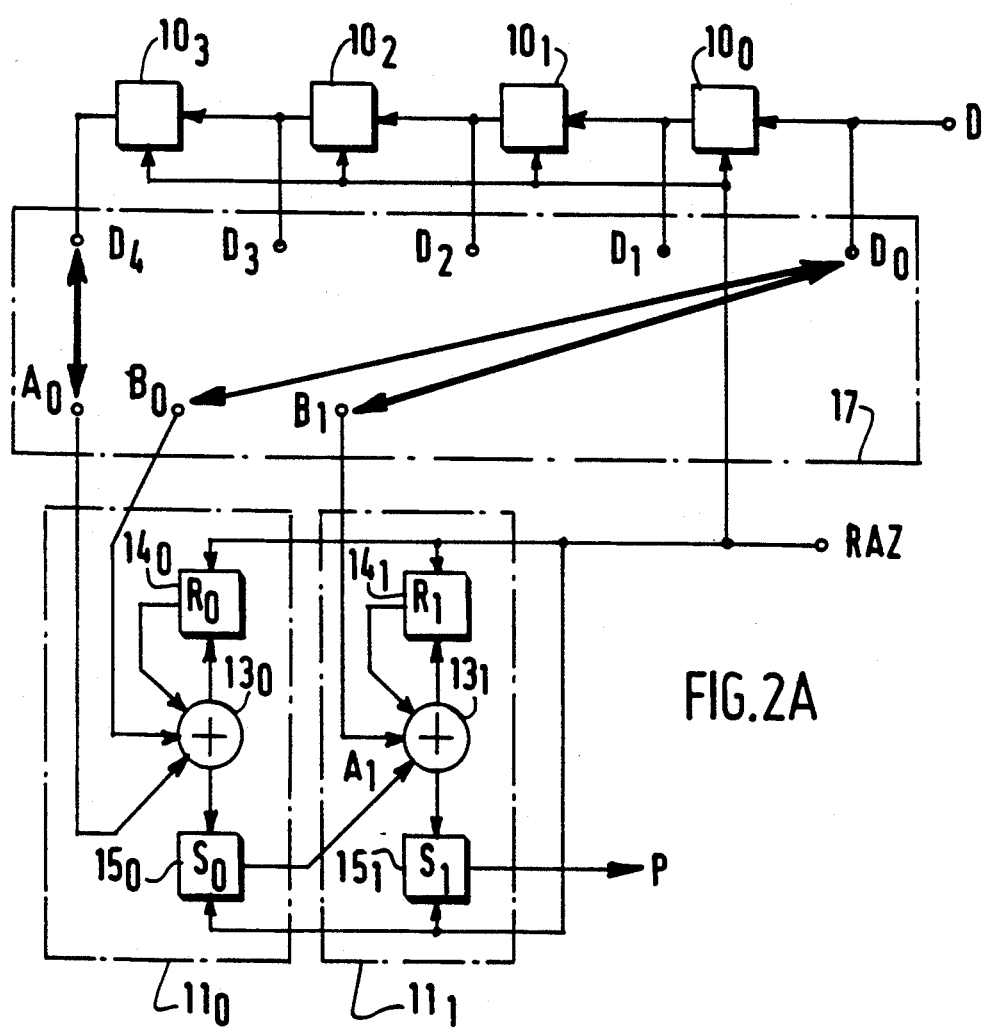
FIG. 2A is a diagram of a multiplier with its interconnections for a particular example with an unsigned coefficient.

FIG. 2A shows a diagram of a multiplier according to the invention with its interconnections for a particular example with an unsigned coefficient.

Let there be a signed multiplicand, coded on 8 2's complement bits and equal to $-86$, and let there be an unsigned coefficient, coded on 6 bits, equal to 35. The product is a signed integer, coded on 14 2's complement bits, and equals $-3010$. Referring to the previous notation, we have $d=8$, $r=6$, $p=8+6=14$. $(r/2)-1=2$ adders and $(r/2)+1=4$ retard cells are required. The coefficient $C=35$ may be written $C=2^5+2^1+2^0$, or in binary notation, 1 0 0 0 1 1. There are therefore as many 1 bits as 0 bits. To perform the multiplication of the multiplicand by $(2^5+2^1)$ the inputs $A_0$ and $B_0$ of the adder $13_0$ must be connected up respectively to the outputs $D_4$ and $D_0$ of the register. The multiplication by $2^0$ is carried out by connecting up the input $B_1$ of the adder $13_1$ to the output $D_0$, its input $A_1$ being connected to the flip-flop $15_0$.

Figure 2B:
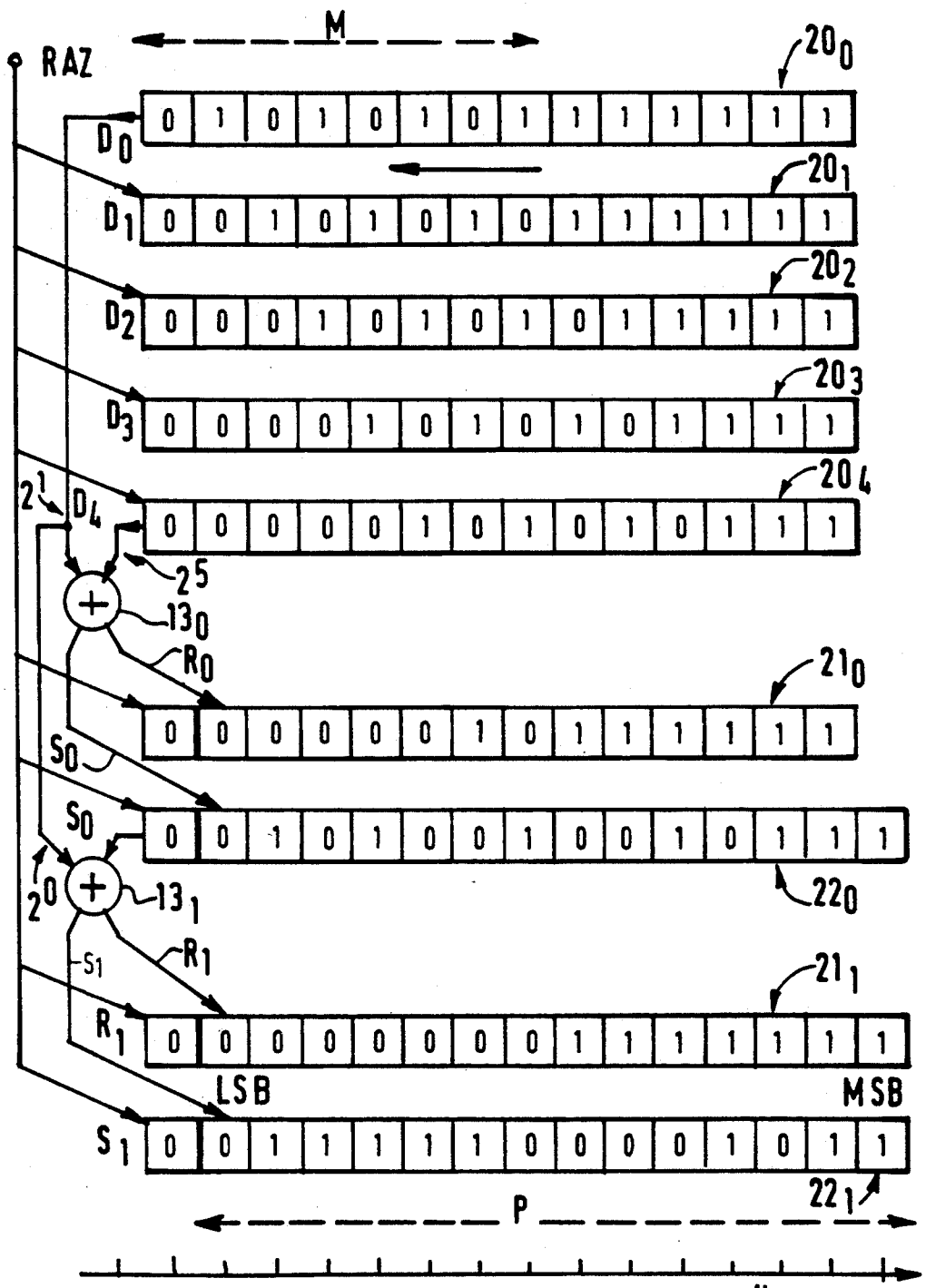
FIG. 2B is a chronogram of the multiplication with $D=-86$ and $C=+35$.

FIG. 2B shows a chronogram of the multiplication for the example of FIG. 2A.

Under the labels $20_0$ to $20_4$ are shown the data of the multiplicand which show up successively on the outputs $D_0$ to $D_4$ at each clock period H. The data issuing from $D_0$ and $D_4$ are added up in the adder $13_0$ ($2^1$ and $2^5$ coefficient). The result of the sum $S_0$ and of the carry $R_0$ are indicated by the labels $22_0$ and $21_0$. The sum $S_0$ is likewise added to the data issuing from $D_0$ ($2^0$ coefficient) in the adder $13_1$, and the results of the sum $S_1$ and of the carry $R_1$ are indicated by the labels $22_1$ and $21_1$.

At the start of an addition cycle, an RAZ signal performs the resetting to zero of all of the flip-flops (registers, carries, sums) so as to initialize the operations in each addition cell. The flip-flop for the sum of the final cell does not require this initialization. In binary, the sum $S_1$ equals 1 1 0 1 0 0 0 0 1 1 1 1 1 0, viz. the value $P=-3010$. The least significant bit LSB shows up one clock period after the start of the appearance of the datum $D_0$. The most significant bit MSB appears last.

Figure 3:
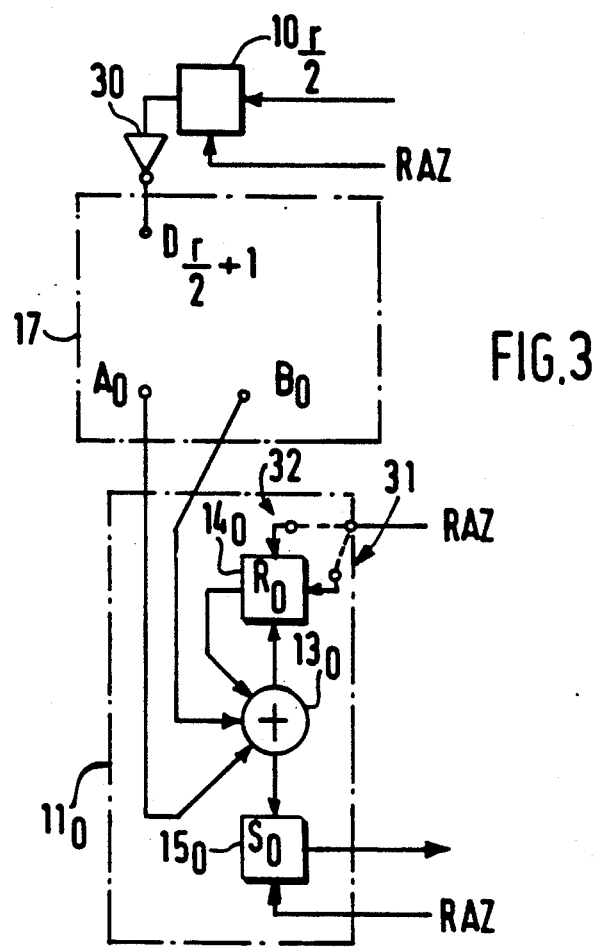
FIG. 3 is a diagram of the portion of FIG. 1 which is modified in order to operate with a signed fixed coefficient.

FIG. 3 shows a diagram of the portion of FIG. 1 which is modified in order to operate with a signed fixed coefficient. The other elements remain the same as those of FIG. 1. In this variant, the final flip-flop $10(r/2)$ of the shift register is followed by an inverter 30 the output of which constitutes the output $D(r/2)+1$ to be connected up to the interconnection channel. The first adder $13_0$ may have its carry $14_0$ initialized to 1 (connection 31) instead of 0 (connection 32). The choice of the 1 or 0 initialization is likewise made by the interconnection channel. When the coefficient is represented in signed 2's complement binary form nothing changes if it is a positive number. On the other hand, if it is a negative number its most significant bit is at 1 and it is no longer expedient to consider the multiplicand shifted by $r-1$ positions, but the number oppositely signed from this number. This relates only to the final cell of the shift register and the first of the battery of adders. The inclusion of the oppositely signed number is carried out by inserting the 1's complemented number (output from the inverter) and by forcing the initial carry to 1, which actually amounts to taking the 2's complement, that is to say the oppositely signed number. All this being defined from the interconnection channel, the essential property of this set-up is therefore preserved.

Figure 4:
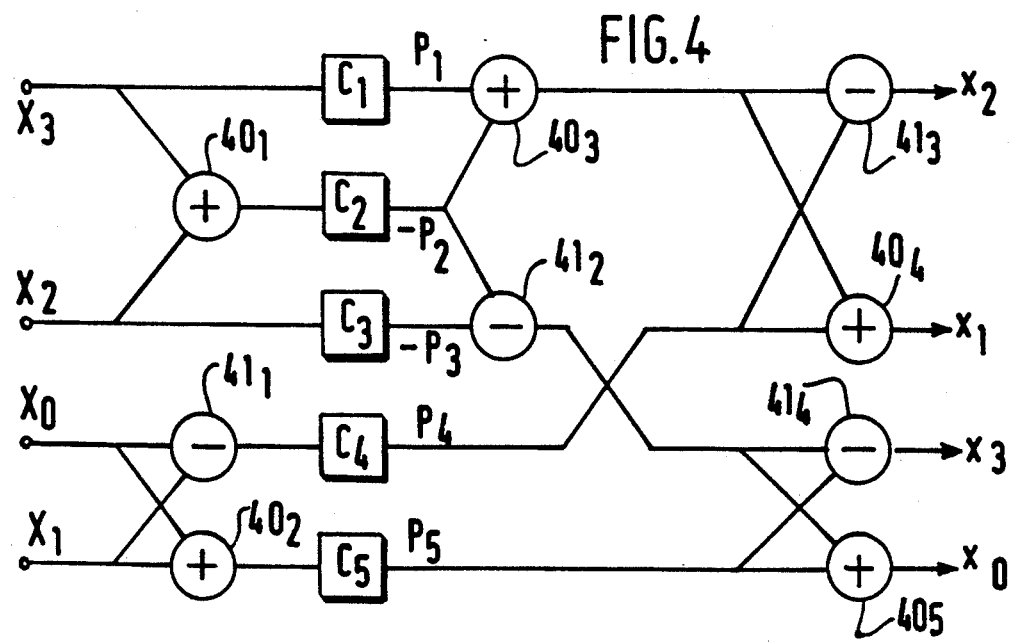
FIG. 4 is a diagram of an example linear transform.

FIG. 4 shows a diagram of an example linear transform. An effecting of a linear transform calls upon a battery of multipliers which are surrounded by adders and subtracters. This implementation may be applied, among other things, to Fourier transforms and to cosine transforms. The use of "serial bit" operators like the multiplier which has just been described makes it possible to profit to the maximum from the pipelining of the various operations. In these cases, the coefficients are combinations of cosine values of particular angles For these numbers, the restriction of not having more than $r/2$ one bits is not acceptable. This difficulty is solved in the following way. When a coefficient C has more than $r/2$ one bits, it is replaced by its oppositely signed number $-C$ and it may easily be verified that C does not then have more than $r/2$ one bits. As output from the multiplier, the result $-P$ is obtained instead of the result P, and in order to take account of the change of sign the adder (respectively subtracter) situated downstream of the multiplier is replaced by a subtracted (respectively an adder). When both coefficients generating products combined in the same downstream operator fall into this category, the type permutation is not carried out on this operator, but on that situated one stage further on.

Let there be four data $X_0$, $X_1$, $X_2$, $X_3$ which undergo a linear transformation with respect to the data $x_0$, $x_1$, $x_2$, $x_3$. The adder $40_1$ adds $X_3$ and $X_2$ and delivers a result which is multiplied by $C_2$. The adder $40_2$ adds $X_0$ and $X_1$ and delivers a result which is multiplied by $C_5$. The subtracter 411 subtracts $X_0$ from $X_1$ and delivers a result which is multiplied by $C_4$. The data $X_2$ and $X_3$ are multiplied by $C_3$ and $C_1$ respectively.

Let us assume that $C_1/C_4$ and $C_5$ contain more zero bits than one bits. Then, according to their sign, either the multiplier of FIG. 1 or the modified one of FIG. 3 is employed to carry out these multiplications and obtain the results $P_1$, $P_4$, $P_5$.

Let us assume that $C_2$ and $C_3$ contain fewer zero bits than one bits. Then, according to the invention, the multiplier is wired so as to perform a multiplication by $-C_2$ and by $-C_3$ respectively, which will supply results $-P_2$ and $-P_3$ respectively. In order to take account of the sign inversion carried out, the adder $40_3$ is then replaced by a subtracter $40_3'$ to obtain the expected result. By contrast, the results $-P_2$ and $-P_3$ which arrive at the (subtraction) operator $41_2$ having both been inverted, the nature of the operation carried out by the operator $41_2$ is not modified, but the change of operator type is carried over to the subsequent operator or operators. In the present case, the operators $41_4$ (subtracter) and $40_5$ (adder) are changed into adder and subtracter respectively. The operators $41_3$ and $40_4$ remain those initially provided.

I claim:

1. Programmable serial multiplier for performing the multiplication of a multiplicand by a fixed constant C coded on r bits comprising:

a series of $(r/2)-1$ addition cells interconnected in cascade via input means of each cell, each addition cell being formed by a 1 bit adder producing a result and a carry, a flip-flop which retards the carry in order to insert it into the input means of the same adder, and a retard element operating on the result from the adder;

a clock-controlled shift register for the serial input of the multiplicand, containing a series of $(r/2)+1$ initializable flip-flops; and connection means for coupling outputs of the initializable flip-flop at selected positions in the shift register to the input means of the adders in order to program the serial multiplier to perform the multiplication by the fixed constant C, either with the selection of positions of flip-flops in the shift register being based on the position of 1s in an operator set equal to the value $+C$, in binary notation, when the constant contains a number of 1s less than or equal to the number of 0s, or set equal to the value $-C$ in the reverse case.

2. Computational processor which carries out a linear transform of numerical data according to operations for multiplication of at least one multiplicand by at least one constant C coded on r bits, then operations for summation of plural partial results, comprising:

a multiplier for producing partial results comprising a series of $(r/2)-1$ addition cells interconnected in cascade via input means of each cell, each addition cell being formed by a 1 bit adder producing a result and a carry, a flip-flop which retards the carry in order to insert it into the in put means of the same adder, and a retard element operating on the result from the adder; a clock-controlled shift register for the serial input of the multiplicand, containing a series of $(r/2)+1$ initializable flip-flops; and connection means for coupling outputs of the initializable flip-flops at selected position in the shift register to the input means of the adders in order to program the serial multiplier to perform the multiplication by the fixed constant C with the selection of positions of flip-flops in the shift register being based on the position of 1s in an operator set equal to one of the values $+C$ and $-C$ having less than or equal to r/2 1s; and means for carrying out a summation operation on two partial results which when only one of said partial results is obtained from a multiplication with said operator set equal to $-C$, the said summation operation is performed by first inverting the the one partial result, and which when said two partial results were both obtained from a multiplication with said operator set equal to $+C$ or both obtained with said operator equal to $-C$, the said summation operation is performed without first inverting the partial results.

3. Programmable serial multiplier according to claim 1 or claim 2, wherein, in order to operate when the constant C is signed, the input means of a first addition cell in said series of addition cells is coupled to a last flip-flop in said shift register through an inverter and said connection means, it being possible to initialize either to 1 or to 0 the flip-flop retarding the carry from said first addition cell.

* * * * *